Figures 1, 2:
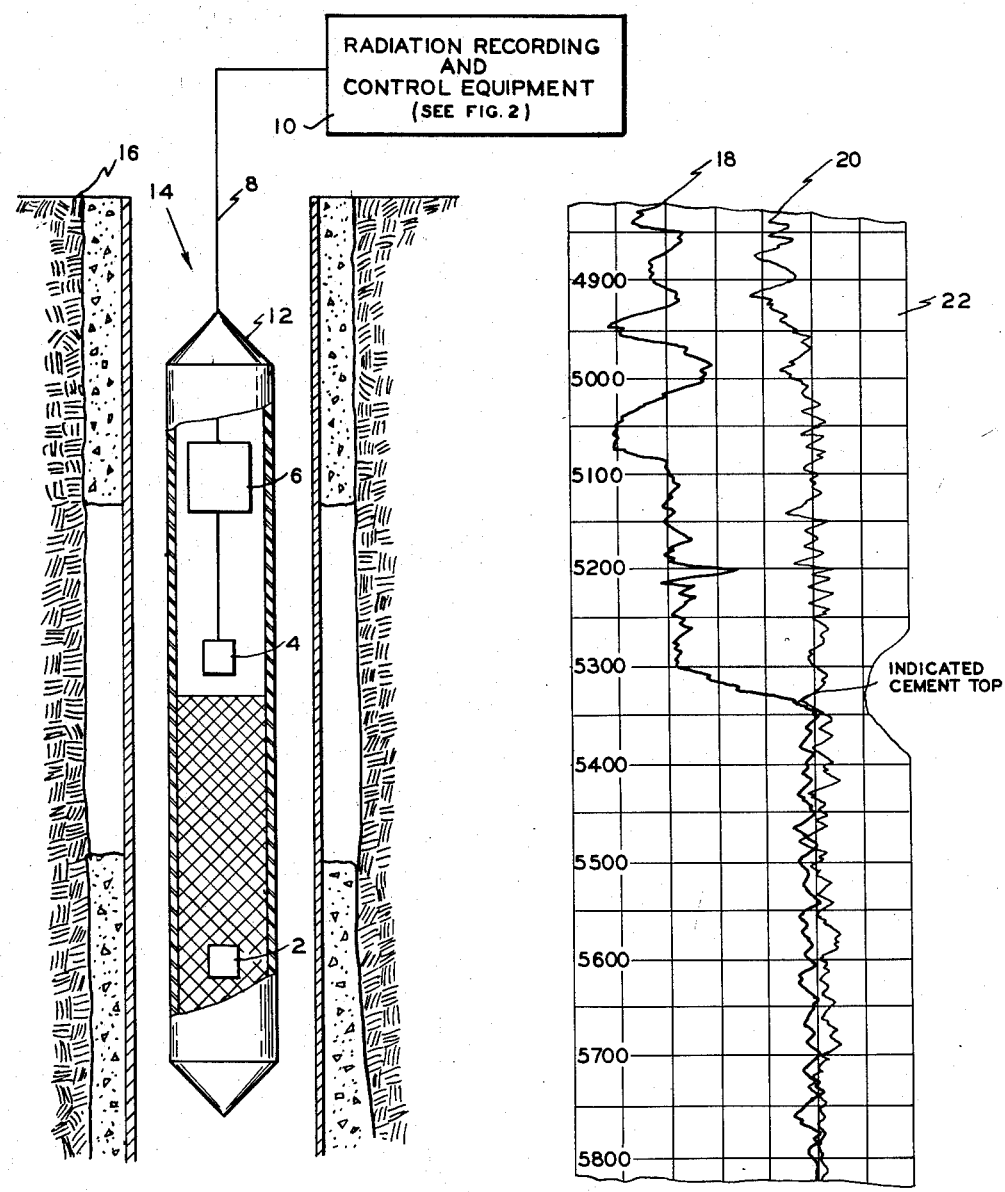

INVENTOR.
JOHN C. WILSON
BY Robert M. Sperry
AGENT 3,081,401
METHOD OF CEMENT DETECTION BY
NUCLEAR LOGGING
John C. Wilson, Houston, Tex., assignor to Dresser Industries, Inc., Dallas, Tex., a corporation of Delaware
Filed May 5, 1959, Ser. No. 811,132
5 Claims. (Cl. 250—83.3)

This invention relates to the logging of wells or boreholes to determine the nature and characteristics of the substances traversed by the borehole, and more particularly to a method of distinguishing cement from other substances and determining the depths at which such cement is located.

When wells are drilled into the earth for the purpose of recovering oil and gas, etc., they necessarily penetrate any water-bearing earth layers and formations which lie above the ultimate depth sought to be reached. The penetration or puncture of such formations obviously affords a route by which any fluids contained therein may drain from their native strata or formation, and enter other formations or co-mingle with the oil or gas sought to be recovered.

To avoid releasing this subsurface water, and also to avoid releasing oil, gas, or other valuable subsurface fluids not immediately sought to be recovered, it is the practice to insert a layer of cement between the casing and the wall of the borehole. However, considerations of cost make it desirable to locate the cement so as to seal only those formations or strata which are fluid bearing, and from which such fluid will escape unless so cemented and sealed.

The practice of cementing a well involves forcing cement down through the well casing, and then up between the casing and the wall of the borehole, until the cement reaches the borehole height desired. If the wall of the borehole is substantially uniform, and if the quantity of cement being inserted is carefully calculated, then the cement may be assumed to have been properly placed when the calculated amount has been pumped into the borehole "behind" the casing. However, if the required amount of cement has been miscalculated, or if the bore hole walls contain cavities of appreciable size, then the cementing operation may be terminated before the cement has reached and has sealed the formations sought to be sealed, since the error cannot be observed from the surface of the earth.

One method of ascertaining that the cement has been properly placed is to check the temperature of the casing at the levels sought to be cemented. This practice utilizes the commonly known fact that, when hardening or "setting," cement gives off a considerable amount of heat. This heat, in turn, is partially transferred to the sections of casing immediately opposite the hardening cement, and therefore those sections of the casing which are warmer (disregarding the conductivity of the casing) are assumed to indicate the location of the cement.

It is also common knowledge, however, that this generation of heat is temporary and continues only through the hardening period of the cement. The temperature of the casing opposite completely hardened cement will not vary from the temperature of uncemented casing merely because of the existence of the cement. In addition, even for cement undergoing the hardening cycle, the amount of heat being generated and the duration of generation varies considerably with the mixture of cement being used. Moreover, hot springs of subsurface water, and other natural sources of subsurface heat may co-operate to give false indications of hardening cement.

Another method of ascertaining that the cement has been properly placed is to pass a radiological well logging device through the well to distinguish cement from other substances by virtue of its comparatively greater density. All such radiological well logging methods now in use involve irradiating the inside of the borehole with neutrons and gamma rays, and then measuring the gamma rays which return to the borehole.

The resulting radiation is inversely related or proportional to the density of the substances being irradiated (disregarding natural radioactivity, and other factors of error) and this fact is the basis of all radiological density well logging methods. In other words, the variations in the intensity of the resulting radiation are assumed to indicate variations in density of the material surrounding the borehole, and the borehole levels producing the weaker signals are presumed to be cement. (The logging devices convert the energy of the detected radiation to electrical signals capable of being recorded.)

In order to identify a particular substance, rather than merely distinguish between relative densities, it is necessary to determine that a particular substance (such as cement) will produce an electrical signal of predetermined level (in a properly calibrated logging device). This is accomplished in the old methods by setting the discriminator in the logging device to admit only those signals which are above, or below (depending upon the substances to be identified) a particular level. In practice, this requires two or more trips into the borehole when cement is to be located, and the usual formations are to be identified, since the discriminator must be adjusted differently to identify cement. Separate trips through the borehole, however, not only result in greatly increasing the "down time" expense in drilling a well, but also produce separate logging records (on separate recording strips) which are difficult to interpret.

These disadvantages of the prior art are overcome with the present invention, and novel methods are provided which permit locating cement during the same borehole trip during which the other formations are logged, and displaying a graphic record of both logs on the same strip to facilitate comparison and interpretation. In other words, when the device is lowered through the well the cement may be located, and when the device is brought up the formations can be logged, or vice versa. Alternately, each log may be made with separate "runs" past the zones of interest in the same direction, but without removing the device from the well between runs.

In addition, the records of both logs may be displayed on the same strip in such manner that, wherever cement is encountered, the graph (record) of the cement log is substantially coincident with the graph of the log of the formations. When properly performed, this new method permits easy and immediate location of cement.

The advantages of the present invention are preferably attained by the use of a radiological well logging device with a discriminator modified to permit remote control and adjustment of the discriminator setting from the surface while the device is in the well, together with necessary electronic equipment and cabling to permit the device output to be transmitted to the surface, and necessary equipment to enable the device operator to graphically record the device output as hereinafter described.

An alternative application of the present invention would include (but not be limited to) the use of a similar radiological well logging device with two or more discriminators adjusted to different pre-selected discriminator levels, and a remotely controlled switching means for selecting the particular discriminator output or outputs desired, together with the aforesaid transmitting and recording equipment.

Accordingly, it is the object of the prsent invention to provide novel methods for radiological well logging.

It is also the object of the present invention to provide novel methods for the identification and location of cement surrounding the casing of a cased borehole.

A specific object of the present invention is to provide a novel method of locating cement surrounding the casing in a cased borehole while determining the character of the formations traversed by said borehole, said method comprising passing a source of neutrons and gamma rays through said borehole, detecting and measuring those gamma rays from said source which are scattered by said cement and which return to said borehole, simultaneously detecting and measuring those gamma rays which result from neutron bombardment of said formations and which enter said borehole, establishing an electrical signal indicative of the energy of said detected scattered gamma rays, establishing a separate electrical signal indicative of the energy of said detected gamma rays resulting from said bombardment, and recording said electrical signals separately in correlation with an indication of the depth at which said detection occurs.

These and other objects and features of the present invention will be apparent from the following detailed description wherein reference is made to the figures of the accompanying drawing.

In the drawing:

FIG. 1 is a view, partly in section, of a borehole containing a radiological well logging device; and, FIG. 2 is a view of the type of record provided by this invention.

In that form of the invention chosen for purposes of illustration in the drawing, FIG. 1 shows a vertical cross section view of a typical borehole 14 containing a radiological well logging device 12 comprising a source of neutrons and gamma rays 2, a radiation detector 4, a discriminator 6, cabling 8 necessary for transmitting electrical impulses to recording and control equipment 10 located above the earth's surface 16.

FIG. 2 shows the section of a typical recording strip 22 wherein cement has been located, and the depth at which it has been located, as indicated by the substantial coincidence of graph line 18 when the discriminator 6 is set to indicate cement, with the graph line 20 which indicates detected radiation during regular logging of the various formations.

With the equipment shown in these figures, the logging device 12 may be lowered into the borehole 14, and then lifted through the borehole 14 with the discriminator 6 set for neutron logging. During this portion of the borehole trip, the radiation source 2 will emit a predetermined intensity of neutrons and gamma rays which penetrate the casing, and penetrate and bombard the substances surrounding the casing. Although this invention is primarily intended for cased boreholes, it can be performed without modification in uncased boreholes as, for example, to locate cement left in old wells from which the casing has been removed.

The gamma rays emitted by the source 2 become scattered in the surrounding substances in inverse relation or proportion to the density of the substances which they penetrate, and therefore, where the substances are very dense, relatively few of the gamma rays will pass through these substances and return to the borehole 14. Those gamma rays which do return to the borehole 14, are sensed by the detector 4 which sends an electrical signal through the discriminator 6 to the recording equipment 10 indicative of the intensity of the detected radiation.

The neutrons emitted by the source 2 penetrate and bombard the substances surrounding the borehole 14 to cause these substances to emit gamma rays in a manner well known to the art. In general, more neutron-induced gamma rays will enter the borehole 14, and be detected, during bombardment of the denser less porous materials. The detection of those gamma rays resulting from such bombardment also sends an electrical signal indicative of the intensity of this detected radiation resulting from neutron bombardment. This signal is produced simultaneously with, and in addition to, the signal effected by detected gamma rays originating at the source 2, and is also sent through the discriminator 6 to the recording equipment 10.

When normal neutron logging is performed, the discriminator 6 is usually adjusted, by means of the remotely operated control equipment 10, to pass only those electrical signals indicative of detected gamma rays with energies greater than about 1.75 mev. The recording equipment 10 will display the record of the neutron log by a graph line 20 on a standard recording strip 22 which also indicates the depth at which the variations occur. As shown in FIG. 2, these variations are shown by displacement of the graph line 20 from the left edge of the recording strip 22, and the greater the intensity of the detected gamma rays, the greater the displacement.

After the logging device 12 has been raised through the borehole 14, the surface control equipment 10 may be used to remotely change the discriminator 6 setting to pass all those electrical signals indicative of gamma ray energies greater than about 100 kev. These values are only approximate limits, however, and specific discriminator 6 settings will be determined by such factors as the type of detector 4 used, the distance between the source 2 and the detector 4, and the character of the formations surrounding the borehole 14.

After the discriminator 6 setting has been so adjusted, the logging device 12 may again be lowered to log the borehole 14 in an upward direction. The graph line 18 will indicate intensity variations in detected radiation, in the same manner as before. However, the operator on the surface may change the manner of recording so that intensity increases will be indicated by displacement away from the right edge of the recording strip 22. When the operator has properly adjusted the amplitude of the electrical signal now being passed by the discriminator 6, the graph line 18 will be substantially coincident with the graph line 20 recorded during neutron logging. Increases in detected radiation, due to the logging device 12 irradiating less dense substances surrounding the borehole 14, will produce a shift of the graph line 18 to the left of the neutron log graph line 20, and this will clearly indicate the top of the cement and the borehole 14 depth at which it occurs.

Numerous variations and modifications may obviously be made without departing from the invention. Accordingly, it should be clearly understood that the form of the invention described above and shown in the figures of the accompanying drawing are illustrative only and are not intended to limit the scope of the invention.

As an alternative to the detection of gamma rays resulting from neutron irradiation, this invention contemplates the measurement of scattered neutrons with the same detector as used to detect gamma rays from the source scattered by the cement. Here, as well as in the case described above, the detector must be of the type which emits electrical signals functionally related to the energy of the incident radiation. For example, the detector may be a scintillation counter having a lithium iodide crystal. In this case, the scattered neutrons will be detected by the crystal and will produce scintillations brighter than those produced by the scattered gamma rays. The pulses produced from such a scintillation counter which are occasioned by neutron detection may thus be distinguished from the pulses produced by scattered gamma radiation in the same manner as described above in connection with gamma rays resulting from neutron irradiation. Broadly then, the invention comprises the use of a common source of gamma rays and neutrons and the detection by a common detector of gamma rays from the source scattered by the cement together with whatever radiations may result from the neutron bombardment of the formations, and the derivation of electrical signals from the detector into two separate channels, one indicative of scattered gamma rays and the other indicative of radiation resulting from neutron bombardment. The signals from these two channels may then be correlated to indicate the position of cement in the hole.

What I claim is:

1. The method of nuclear well logging comprising the steps of irradiating the material outside the casing of a cased borehole with gamma rays and neutrons from a common source, detecting with a common detector gamma rays scattered by cement outside said casing and radiations resulting from neutron bombardment of the formations outside said borehole, establishing a first electrical signal indicative of said scattered gamma rays, establishing a second electrical signal indicative of said radiation, and indicating the location of said cement in said borehole by correlatively displaying said signals with a common indication of depth.

2. A method of investigating the character of substances surrounding the casing in a cased borehole, said method comprising the steps of irradiating said substances with a flux of radiation composed substantially of neutrons and of relatively low energy gamma rays in a manner such that relatively high energy resultant radiations are induced in said substances by at least a substantial number of said neutrons and such that at least a substantial number of said relatively low energy gamma rays are scattered in said substances, detecting a representative number of said resultant radiations and said scattered gamma rays which enter said casing from said irradiated substances, deriving electrical pulses having amplitudes functionally related in magnitude to respective ones of said detected radiations and scattered gamma rays, establishing a first electrical signal by selecting those of said pulses having amplitudes occurring within a pre-determined range of amplitudes which is inclusive of at least a substantial number of those pulses related to said detected scattered gamma rays and which is lower than and exclusive of at least a substantial number of those pulses related to said detected radiations, establishing a second electrical signal by selecting those of said pulses having amplitudes greater than said pre-determined range of amplitudes, and recording said signals correlatively with an indication of depth.

3. The method of claim 2 wherein said recording comprises graphically displaying said signals correlatively with an indication of depth on a recording strip in a manner such that variations in intensity appear as proportionately related variations in the displacements of said signals respectively from opposite edges of said strip.

4. The method of claim 3 wherein said resultant radiations include at least a substantial number of said neutrons which are scattered in said substances and which enter said casing at relatively high energies.

5. The method of claim 3 wherein said resultant radiations include at least a substantial number of relatively high energy gamma rays.

References Cited in the file of this patent
UNITED STATES PATENTS

| | | |
|---|---|---|
| 2,322,634 | Howell et al. | June 22, 1943 |
| 2,398,324 | Pontecorvo | Apr. 9, 1946 |
| 2,469,461 | Russell | May 10, 1949 |
| 2,469,463 | Russell | May 10, 1949 |
| 2,580,544 | Herzog | Jan. 1, 1952 |
| 2,648,012 | Scherbatskoy | Aug. 4, 1953 |
| 2,648,780 | Herzog | Aug. 11, 1953 |
| 2,659,014 | Scherbatskoy | Nov. 10, 1953 |
| 2,692,949 | MacKnight | Oct. 26, 1954 |
| 2,710,925 | McKay | June 14, 1955 |
| 2,755,389 | Jones et al. | July 17, 1956 |
| 2,934,652 | Caldwell et al. | Apr. 26, 1960 |
| 2,948,810 | Caldwell et al. | Aug. 9, 1960 |